US009116841B2

(12) United States Patent
Ang et al.

(10) Patent No.: US 9,116,841 B2
(45) Date of Patent: Aug. 25, 2015

(54) METHODS AND SYSTEMS FOR SECURELY TRANSFERRING EMBEDDED CODE AND/OR DATA DESIGNED FOR A DEVICE TO A CUSTOMER

(71) Applicant: Infineon Technologies AG, Neubiberg (DE)

(72) Inventors: Min Wei Ang, Singapore (SG); Gerd Dirscherl, Munich (DE); Arno Rabenstein, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/687,066

(22) Filed: Nov. 28, 2012

(65) Prior Publication Data

US 2014/0149748 A1     May 29, 2014

(51) Int. Cl.
*G06F 12/14*     (2006.01)
(52) U.S. Cl.
CPC ................... *G06F 12/1408* (2013.01)
(58) Field of Classification Search
CPC .................................................. G06F 12/1408
See application file for complete search history.

(56) References Cited

U.S. PATENT DOCUMENTS

| 5,398,285 | A | * | 3/1995 | Borgelt et al. ................... 380/30 |
| 7,194,633 | B2 | * | 3/2007 | Kaiserswerth et al. ....... 713/189 |
| 7,237,121 | B2 | * | 6/2007 | Cammack et al. ............ 713/189 |
| 7,742,992 | B2 | * | 6/2010 | Cronce ........................... 705/59 |
| 7,802,085 | B2 | * | 9/2010 | Graunke .......................... 713/2 |
| 8,041,957 | B2 | * | 10/2011 | Michaelis et al. ............. 713/187 |
| 2012/0198224 | A1 | * | 8/2012 | Leclercq ........................... 713/2 |

FOREIGN PATENT DOCUMENTS

EP     1304827 A1 * 4/2003

OTHER PUBLICATIONS

English translation of EP 1304827 A1.*

* cited by examiner

*Primary Examiner* — Brandon Hoffman
*Assistant Examiner* — Wasika Nipa
(74) *Attorney, Agent, or Firm* — Eschweiler & Associates, LLC

(57) ABSTRACT

The invention relates to methods and systems for securely transferring embedded code or data to a customer, in particular to methods and systems for securely transferring embedded code, data files or program files designed for a device to a customer in order to prevent the embedded code, data files or program files from being used on unauthorized devices.

17 Claims, 3 Drawing Sheets

METHODS AND SYSTEMS FOR SECURELY TRANSFERRING EMBEDDED CODE AND/OR DATA DESIGNED FOR A DEVICE TO A CUSTOMER

FIELD

The invention relates to methods and systems for securely transferring embedded code and/or data to a customer, in particular to methods and systems for securely transferring embedded code, data files and/or program files designed for a device to a customer in order to prevent the embedded code, data files and/or program files from being used on unauthorized devices.

BACKGROUND

Manufacturers of various devices, such as semiconductor manufacturers, for example, sell their devices, such as integrated circuit components, for example, to different customers. Specialized suppliers provide embedded code or data for the respective devices to configure and/or customize the respective devices according to the demands and requests of the customers. The customers may then program the devices bought from the manufacturer at their location with the embedded code or data obtained from the suppliers.

This transfer of embedded code or data involves a number of piracy risks. The embedded code or data could leak through grey channels to a pirate production plant which could then program clone hardware using available loader tools from the Internet. The customer could also try to pay less license fees to the software producer by under-declaring the number of produced devices containing the embedded code or data since this information is transparent to the software producer.

One approach for protecting embedded code or data is to provide the devices to be sold with unique identification numbers so that the software producers can include trap routines in the embedded code. These trap routines freeze the operation of the device if the embedded code is used illegally. However, besides increasing the code size, this scheme can still be reasonably hacked by replacing the trap routines with dummy code.

Therefore, there exists a need for a method and system for securely transferring embedded code and/or data designed for a device to a customer in order to prevent the embedded code or data from being used on unauthorized devices.

SUMMARY

In accordance with an aspect of the invention, there is provided a method for securely transferring embedded code and/or data designed by a supplier for a device produced by a manufacturer to a customer. The method comprises storing a first encryption key in a memory of a device to be delivered to a customer, encrypting embedded code and/or data designed for the device using a second encryption key, and encrypting the second encryption key using the first encryption key.

In accordance with a further aspect of the invention, there is provided a system for securely transferring embedded code and/or data designed for a device to a customer. The system comprises a secure boot loader and a first encryption key stored in a memory of a device. The secure boot loader is configured to receive a second encryption key encrypted with the first encryption key, receive embedded code and/or data designed for the device and encrypted with the second encryption key, decrypt the received encrypted second encryption key using the first encryption key stored in the device, and decrypt the embedded code and/or data using the decrypted second encryption key.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION

In the following detailed description, reference is made to the accompanying drawings, which form a part thereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figure 1:
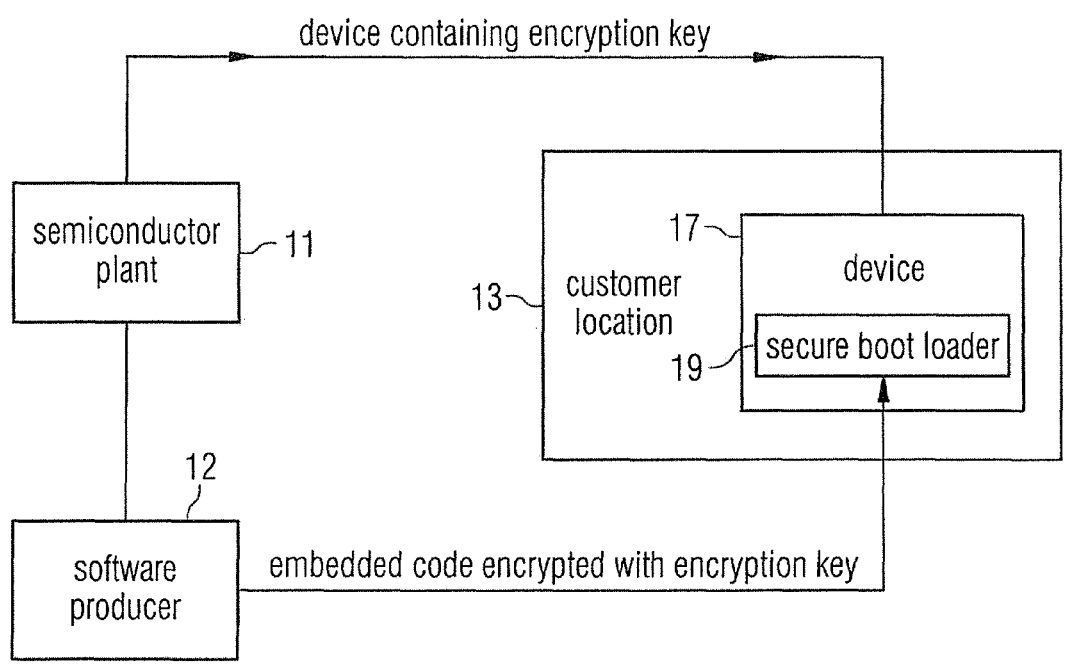
FIG. 1 shows a simplified schematic diagram of an example environment wherein a system according to an embodiment of the invention may be implemented.

FIG. 1 shows a simplified schematic diagram of an example environment wherein a system according to an embodiment of the invention may be implemented. A device 17 is produced by a manufacturer, e.g. a semiconductor manufacturer, at the manufacturer's location, e.g. a semiconductor plant 11, sold to a customer and delivered to the customer location 13. In addition, a supplier which can be a software producer 12 in this example, provides the customer with an embedded code or data designed for the device 17 bought by the customer. The customer will then program the device 17 bought from the manufacturer at their location 13 with the embedded code or data provided by the supplier or software producer 12 in this example. The customer can be a distributor which customizes the devices, a company which integrates the devices in their own products, or a user, for example.

This transfer of embedded code or data involves a number of piracy risks. The embedded code or data could leak through grey channels to a pirate production plant which could then program clone hardware using available loader tools from the Internet. The customer could also try to pay less license fees to the supplier by under-declaring the number of produced devices containing the embedded code or data since this information is transparent to the supplier.

In order to protect the embedded code or data from unauthorized access and use, an encryption scheme for securely transferring the embedded code or data to a customer has been developed.

According to an embodiment of the invention, the (semi-) conductor manufacturer provides each device with an encryption key which may be stored in a memory, such as a flash memory, of the device 17. Thus, the customer obtains an encryption key together with the ordered device 17.

The supplier or, in this example, software producer 12, provides the embedded code or data designed for the device 17 to the customer in encrypted form, i.e. encrypted with the encryption key.

However, in order to avoid revealing the encryption key to the software producer, the (semiconductor) manufacturer may perform the encryption of the embedded code or data with the encryption key.

Alternatively, the manufacturer may provide the software producer with an identification (ID) number allocated to the respective device to enable the software producer to generate the encryption key based on the ID number using a master key or a database. The thus generated encryption key is used to encrypt the embedded code or data without revealing the encryption key itself. Though the software producer may generate the encryption key as an intermediate result, this intermediate result is a direct input to the encryption of the embedded code or data and is otherwise not accessible. Thus, also in this case, the software producer does not get knowledge of the encryption key as this key is an intermediate result within a closed process which is protected from external access.

The software producer 12 may then transmit the encrypted code/data to the customer location 13. At the customer location 13, the encrypted embedded code/data is received and fed to the secure boot loader 19 of the device 17 to program the device 17. The secure boot loader 19 decrypts the encrypted embedded code/data and stores the decrypted embedded code/data in a memory, in particular a flash memory, of the device 17.

Figure 2:
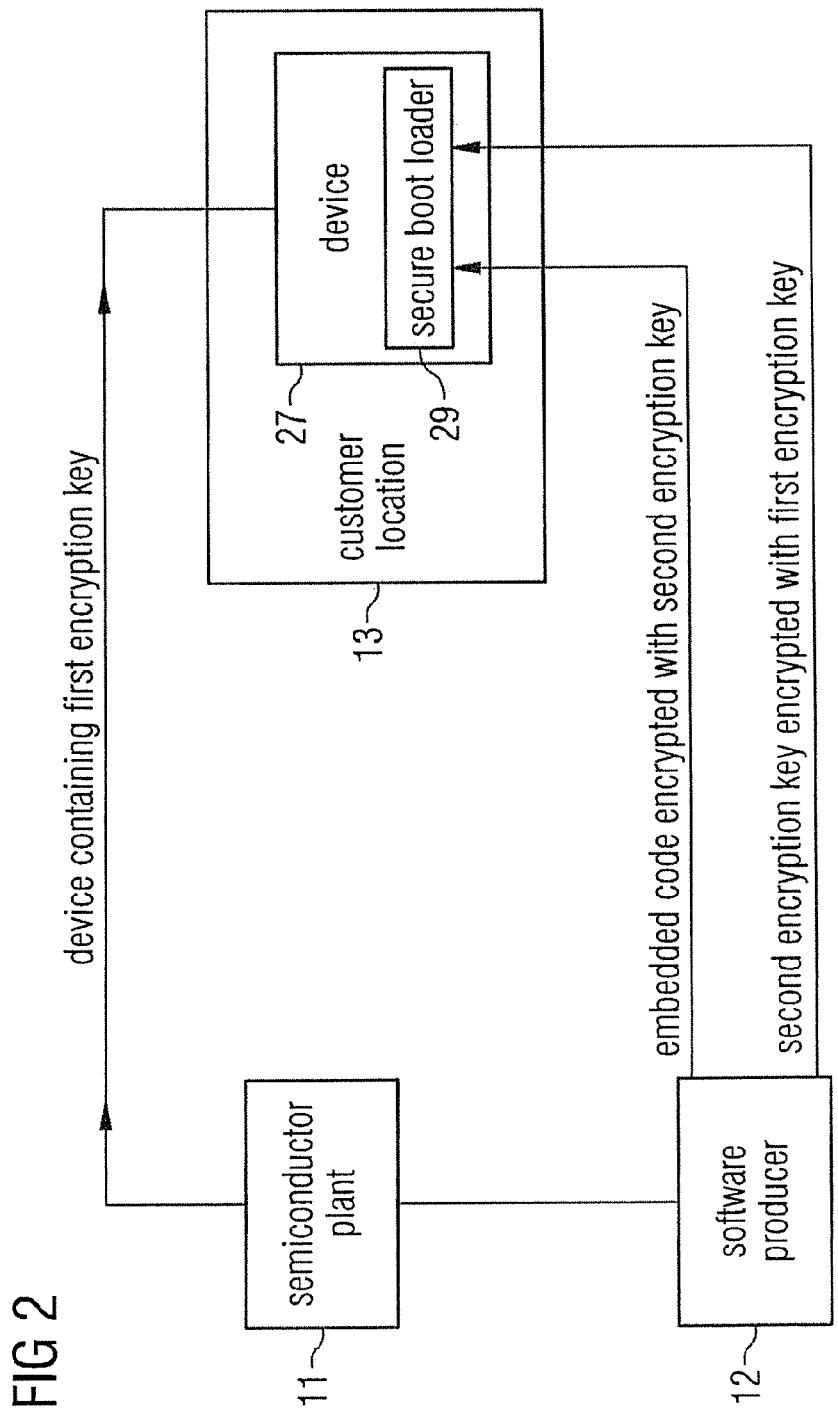
FIG. 2 shows a simplified schematic diagram of a further example environment wherein a system according to a further embodiment of the invention may be implemented.

FIG. 2 shows a simplified schematic diagram of a further example environment wherein a system according to a further embodiment of the invention may be implemented.

A device 27 is produced by a manufacturer, e.g. a semiconductor manufacturer, at the manufacturer's location, e.g. a semiconductor plant 11, sold to a customer and delivered to the customer location 13. In addition, a supplier which can be a software producer 12 in this example, provides the customer with an embedded code or data designed for the device 27 bought by the customer. The customer will then program the device 27 bought from the manufacturer at their location 13 with the embedded code or data provided by the supplier or software producer 12 in this example. The customer can be a distributor which customizes the devices, a company which integrates the devices in their own products or a user, for example.

In this embodiment which provides an increased protection of the embedded code or data, the (semiconductor) manufacturer provides each device with a first encryption key which may be stored in a memory, such as a flash memory, of the device 27. Thus, the customer obtains the first encryption key together with the ordered device 27.

The supplier or, in this example, software producer 12 provides the embedded code or data designed for the device 27 to the customer in encrypted form, in this case, encrypted with a second, different encryption key. The second encryption key for encrypting the embedded code or data is also transmitted to the customer in encrypted form, wherein the second encryption key is encrypted with the first encryption key.

However, in order to avoid revealing the first encryption key to the supplier, the manufacturer may perform the encryption of the second encryption key with the first encryption key and provide the software producer with the encrypted second encryption key.

Alternatively, the semiconductor manufacturer may provide the software producer 12 with an identification (ID) number allocated to the respective device to enable the software producer 12 to generate the first encryption key based on the ID number using a master key or a database. The reproduced first encryption key is used to encrypt the second encryption key without revealing the first encryption key itself. Though the software producer 12 may generate the first encryption key as an intermediate result, this intermediate result is directly input to the encryption process for the second encryption key and is otherwise not accessible. Thus, also in this case, the software producer does not get knowledge of the first encryption key as it is an intermediate result within a closed process which is protected from external access.

The software producer 12 then transmits both the encrypted embedded code/data and the encrypted second encryption key to the customer location.

At the customer location, the encrypted embedded code/data and the encrypted second encryption key are received and fed to the secure boot loader 29 of the device 27. The secure boot loader 29 decrypts the encrypted second encryption key using the first encryption key stored within the device 27, decrypts the embedded code or data using the decrypted second encryption key and stores the decrypted embedded code/data in a memory, e.g. a flash memory, of the device 27. The embedded code or data can then be used for programming the device 27.

In both embodiments described above, received encrypted data may be downloaded first into a random access memory (RAM) of the device 17 and 27, respectively, using the secure boot loader 19 and 29, respectively, which may be part of the firmware of the device 17 and 27, respectively. The secure boot loader 19 and 29, respectively, may be in the form of a flash memory as well. Based on the type of data, the secure boot loader 19 and 29, respectively, may then perform the decryption and programming to targeted locations on a flash memory.

With the encryption key controlled system, the specific number of devices authorized to run or use the embedded code or data is controllable and may also be provided to the software producers as a value-added service. By including different (first) encryption keys in the devices produced by the semiconductor manufacturer, the number of devices which can use the encrypted embedded code or data is limited. The group of devices which are allocated a common encryption key is arbitrary. For example, one unique encryption key may be allocated to one batch of devices or to all devices provided to a certain customer. Even a unique encryption key could be allocated to each single device which would, however, involve rather high administrative effort.

In the embodiment wherein the software producer generates a second encryption key, the software producer obtains a rough estimation of distributed embedded codes/data. Given that a separate second encryption key is generated for each first encryption key, the total number of distributed codes/data may be obtained by multiplying the number of generated second encryption keys by the number of devices which are furnished with a common first encryption key.

With the encryption key controlled system and/or the corresponding method described above, further data and/or codes for configuring devices may securely be transferred, too. The task of device variant configuration may be delegated to the customer by providing the customer with an encrypted file which performs the desired configuration when executed. For example, special hardware features may be enabled or disabled, such as access to memory regions, etc. In particular, a specific set of hardware features required for a certain embedded code may also be activated by such a file transmitted in encrypted form. Similarly, an encrypted peripheral activation code (PAC) may be transmitted to the customer so that the customer can tailor a feature set according to the application's needs and unlock dedicated peripherals. Furthermore, a customer may also be offered the possibility to upgrade a device bought in the past by purchasing the appropriate encrypted file which activates the desired additional features when executed.

Furthermore, an update of the second encryption key may be facilitated by securely transferring the new second encryption key in encrypted form, encrypted with the first encryption key, for example.

Any encryption algorithm may be used in order to provide suitable encryption means for the embodiments of the invention. Accordingly, encryption may be based on symmetric encryption algorithms such as AES (Advanced Encryption Standard), DES (Data Encryption Standard), Triple-DES, Blowfish, Serpent, Twofish, etc., or public-key cryptography also called asymmetric key cryptography which uses asymmetric key algorithms (e.g. RSA). One embodiment of the invention uses AES as encryption algorithm.

A hybrid cryptosystem may also be used. The hybrid cryptosystem is itself a public-key system, which encapsulates a symmetric-key scheme. Thus, for a large library software, the bulk of the work in encryption/decryption could be done by the more efficient symmetric-key scheme, while the inefficient public-key scheme is only used to encrypt/decrypt a short session key value. As soon as the session key is decrypted using the private key, the efficient implementation of the symmetric-key decryption may be used for flash programming. In a hybrid system, the first encryption key used in embodiments described above may be an asymmetric key and the second encryption key may be a symmetric key, for example.

Figure 3:
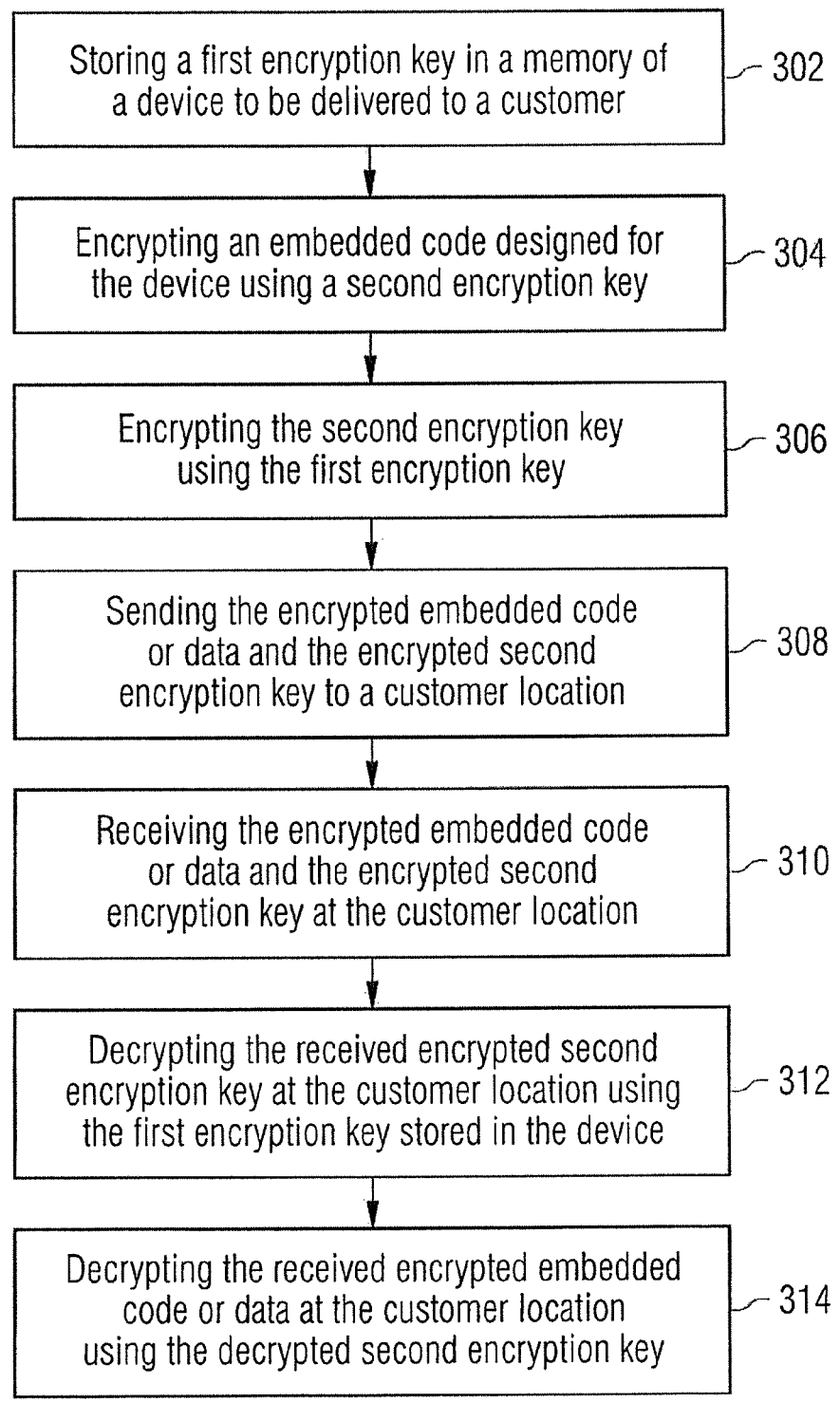
FIG. 3 shows an example method according to an embodiment of the invention.

FIG. 3 shows an example method according to an embodiment of the invention, in particular, a method for securely transferring embedded code or data designed by a supplier for a device produced by a manufacturer to a customer. The example method comprises storing a first encryption key in a memory of a device to be delivered to a customer at 302, and encrypting embedded code or data designed for the device using a second encryption key at 304. The method further comprises encrypting the second encryption key using the first encryption key at 306, sending the encrypted embedded code or data and the encrypted second encryption key to a customer location at 308, and receiving the encrypted embedded code or data and the encrypted second encryption key at the customer location at 310. Still further, the method comprises decrypting the received encrypted second encryption key at the customer location using the first encryption key stored in the device at 312, and decrypting the received encrypted embedded code or data at the customer location using the decrypted second encryption key at 314. It is, however, to be appreciated that the order of steps depicted in FIG. 3 and described above is only one example sequence and many other sequences of actions are also possible.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for securely transferring embedded software code designed by a software code supplier for a semiconductor device produced by a semiconductor device manufacturer to a customer, wherein the software code supplier and the semiconductor device manufacturer are different entities, the method comprising:
   providing a plurality of semiconductor devices comprising different batches of semiconductor devices, wherein each batch comprises one or more semiconductor devices;
   storing, by the semiconductor device manufacturer, different first encryption keys in memories of different respective batches of semiconductor devices of the plurality of semiconductor devices to be delivered to a customer;
   encrypting, by the software code supplier, the embedded software code designed for the semiconductor devices using a second encryption key;
   generating, by the software code supplier, each of the different first encryption keys based on respective identification (ID) numbers associated with each batch of the semiconductor devices of the plurality of semiconductor devices to directly use the generated different first encryption keys, by the software code supplier, for the different batches of the semiconductor devices, respectively, to encrypt the second encryption key within a closed process protected from external access such that the different first encryption keys generated by the software code supplier are not otherwise accessible;
   and decrypting the embedded software code using the second encryption key decrypted by using the different first encryption keys at a location of the customer.

2. The method of claim 1, wherein the second encryption key is generated by the manufacturer and stored within the semiconductor devices to be delivered to the customer.

3. The method of claim 1, wherein generation of the second encryption key is carried out by the software code supplier.

4. The method of claim 1, wherein the different first encryption keys are reproduced based on the identification number and using a master key or a database.

5. The method of claim 1, wherein decrypting the embedded software code comprises:
   sending the encrypted embedded software code and the encrypted second encryption key to a customer location;
   receiving the encrypted embedded software code and the encrypted second encryption key at the customer location;
   decrypting the received encrypted second encryption key at the customer location using the first encryption key stored in the semiconductor device; and
   decrypting the received encrypted embedded code or data at the customer location using the decrypted second encryption key.

6. A system for securely transferring embedded software code designed for a semiconductor device to a customer, the system comprising:
   a plurality of semiconductor devices comprising different batches of semiconductor devices, wherein each batch comprises one or more semiconductor devices; and
   a secure boot loader and different first encryption keys stored in memories of different respective batches of semiconductor devices of the plurality of semiconductor devices, wherein each of the different first encryption keys are based on respective identification (ID) numbers associated with each batch of the semiconductor devices;
   wherein each of the secure boot loaders is configured to:
      receive a second encryption key that itself is encrypted with the respective first encryption key in a closed process protected from external access such that the different first encryption keys are not otherwise accessible;

receive embedded software code designed for the respective batch of semiconductor devices and encrypted with the second encryption key;

decrypt the received encrypted second encryption key using the respective first encryption key based on the ID number of the respective batch of the plurality of semiconductor devices; and decrypt the embedded software code using the decrypted second encryption key for the respective batch of the plurality of semiconductor devices.

7. A method for preventing unauthorized use of embedded software code designed by a software code supplier for semiconductor devices produced by a semiconductor device manufacturer, wherein the software code supplier and the semiconductor device manufacturer are different entities, the method comprising:

generating, by the semiconductor device manufacturer, different first encryption keys for different batches of semiconductor devices, respectively;

storing, by the semiconductor device manufacturer, the different first encryption keys in memories of different respective batches of semiconductor devices of a plurality of semiconductor devices to be delivered to a customer;

generating a second encryption key;

encrypting the embedded software code designed for the device using the second encryption key; and generating, by the software code supplier, each of the different first encryption keys for different batches of semiconductor devices, respectively, based on respective identification (ID) numbers associated with each batch of the semiconductor devices to directly use the generated different first encryption keys, by the software code supplier, to generate a plurality of different encrypted second encryption keys each associated with a different batch of semiconductor devices, wherein the second encryption keys are encrypted within a closed process protected from external access such that the different first encryption keys generated by the software code supplier are not otherwise accessible.

8. The method of claim 7, wherein generating the second encryption key and encrypting the embedded software code are carried out by the software code supplier.

9. The method of claim 7, wherein the second encryption key is generated by the semiconductor device manufacturer and stored within the semiconductor device to be delivered to the customer.

10. The method of claim 7, further comprising:

sending the encrypted embedded software code and the encrypted second encryption key to the customer;

decrypting the received encrypted second encryption key at a customer location using the first encryption key stored in the semiconductor device; and decrypting the received encrypted embedded software code at the customer location using the decrypted second encryption key.

11. A method for preventing unauthorized use of a program file designed by a software code supplier for configuring or updating a semiconductor device produced by a semiconductor device manufacturer, wherein the software code supplier and the semiconductor device manufacturer are different and having different first encryption keys stored in memories of different respective batches of semiconductor devices of a plurality of semiconductor devices, wherein each batch comprises one or more semiconductor devices, the method comprising:

generating a second encryption key;

encrypting the program file using the second encryption key; and generating, by the software code supplier, each of the different first encryption keys for different batches of semiconductor devices, respectively, based on respective identification (ID) numbers associated with each batch of the semiconductor devices to directly use the generated different first encryption keys, by the software code supplier, to generate a plurality of different encrypted second encryption keys each associated with a different batch of semiconductor devices, wherein the second encryption keys are encrypted within a closed process protected from external access such that the different first encryption keys generated by the software code supplier are not otherwise accessible.

12. The method of claim 11, further comprising:

sending the encrypted program file and the encrypted second encryption key to a customer.

13. The method of claim 11, wherein the program file activates a hardware feature or a set of hardware features of the semiconductor device when executed.

14. The method of claim 11, wherein the program file is adapted to configure the semiconductor device produced by the semiconductor device manufacturer to specific requirements of a customer.

15. The method of claim 11, wherein the program file is adapted to upgrade the semiconductor device produced by the semiconductor device manufacturer.

16. The method of claim 11, wherein generation of the second encryption key is carried out by the software code supplier.

17. The method of claim 11, wherein the different first encryption keys are reproduced based on the identification number and using a master key or a database.

* * * * *